United States Patent
Ohta

(10) Patent No.: US 12,354,631 B2
(45) Date of Patent: Jul. 8, 2025

(54) RAMP SUPPORT FOR A MAGNETIC STORAGE DEVICE

(71) Applicant: Western Digital Technologies, Inc., San Jose, CA (US)

(72) Inventor: Katsuhiko Ohta, Tokyo (JP)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 18/360,582

(22) Filed: Jul. 27, 2023

(65) Prior Publication Data

US 2024/0386910 A1 Nov. 21, 2024

Related U.S. Application Data

(60) Provisional application No. 63/467,244, filed on May 17, 2023.

(51) Int. Cl.
| | |
|---|---|
| *G11B 5/54* | (2006.01) |
| *G11B 5/48* | (2006.01) |
| *G11B 21/12* | (2006.01) |
| *G11B 21/22* | (2006.01) |

(52) U.S. Cl.
CPC .............. *G11B 5/54* (2013.01); *G11B 5/4806* (2013.01); *G11B 21/12* (2013.01); *G11B 21/22* (2013.01)

(58) Field of Classification Search
None
See application file for complete search history.

(56) References Cited

U.S. PATENT DOCUMENTS

| | | | | |
|---|---|---|---|---|
| 5,341,260 A | * | 8/1994 | Jabbari ............... | G11B 21/12 360/254.8 |
| 6,134,076 A | | 10/2000 | Boutaghou et al. | |
| 6,226,154 B1 | * | 5/2001 | Albrecht ............... | G11B 5/54 360/254.8 |

(Continued)

OTHER PUBLICATIONS

Ramp Load/Unload Technology in Hard Disk Drives, www.hgst.com, accessed from https://documents.westerndigital.com/content/dam/doc-library/en_us/assets/public/western-digital/collateral/white-paper/loadunload-white-paper-final.pdf on Jul. 27, 2023, 7 pages.

(Continued)

*Primary Examiner* — Craig A. Renner
(74) *Attorney, Agent, or Firm* — Kunzler Bean & Adamson

(57) ABSTRACT

A ramp support for a magnetic storage device includes a first ramp, having a first-ramp receiving end and a first-ramp surface, and a second ramp, having a second-ramp receiving end, offset laterally from the first-ramp receiving end, and a second-ramp surface. A first first-ramp portion faces and is angled toward a virtual plane. A second first-ramp portion faces and is angled away from the virtual plane. A third first-ramp portion faces and is angled toward the virtual plane. A first second-ramp portion faces and is angled toward the virtual plane, and a second second-ramp portion faces and is angled away from the virtual plane. In the direction along the virtual plane, the first second-ramp portion extends further than the first first-ramp portion and terminates at the same location relative to the plane as the second second-ramp portion, and the third first-ramp portion extends further than the second second-ramp portion.

19 Claims, 8 Drawing Sheets

(56) References Cited

U.S. PATENT DOCUMENTS

| | | | |
|---|---|---|---|
| 6,414,821 B1 * | 7/2002 | Tokuyama et al. | G11B 5/54 360/254.8 |
| 6,674,613 B2 * | 1/2004 | Arikawa et al. | G11B 5/54 360/254.8 |
| 7,675,712 B2 | 3/2010 | Liu et al. | |
| 10,803,891 B1 | 10/2020 | Jacoby et al. | |
| 10,943,614 B1 | 3/2021 | Xu et al. | |
| 11,094,347 B1 | 8/2021 | Herdendorf et al. | |
| 11,308,984 B2 | 4/2022 | Herdendorf et al. | |
| 11,423,927 B2 | 8/2022 | Mendonsa et al. | |

OTHER PUBLICATIONS

Liu et al., Characteristics of Ramp Load of Hard Disk Drive With Magnetic Bias and Inertia Latch, IDETC/CIE, Sep. 2007, pp. 1-8, accessed from http://proceedings.asmedigitalcollection.asme.org/ on Dec. 3, 2017.

* cited by examiner

RAMP SUPPORT FOR A MAGNETIC STORAGE DEVICE

FIELD

This disclosure relates generally to magnetic storage devices, and more particularly to improving capacities of ramp supports of magnetic storage devices to hold read-write head assemblies of the magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Read-write heads can be offloaded from the disks and onto ramp supports when not reading data from or writing data to the disks.

SUMMARY

The subject matter of the present application has been developed in response to the present state of the art, and in particular, in response to the shortcomings of ramp supports for magnetic storage devices that have not yet been fully solved by currently available techniques. Accordingly, the subject matter of the present application has been developed to provide ramp supports for magnetic storage devices that overcome at least some of the above-discussed shortcomings of prior art techniques.

The following is a non-exhaustive list of examples, which may or may not be claimed, of the subject matter disclosed herein.

The following portion of this paragraph delineates example 1 of the subject matter, disclosed herein. According to example 1, a ramp support for a magnetic storage device includes a first ramp. The first ramp includes a first-ramp receiving end and a first-ramp surface. The first-ramp surface includes a first first-ramp portion, a second first-ramp portion, and a third first-ramp portion. The ramp support includes a second ramp. The second ramp includes a second-ramp receiving end offset laterally from the first-ramp receiving end in a direction along a virtual plane interposed between the first ramp and the second ramp. The second ramp also includes a second-ramp surface. The second-ramp surface includes a first second-ramp portion and a second second-ramp portion. In the direction along the virtual plane, the first first-ramp portion faces and is angled toward the virtual plane. The second first-ramp portion faces and is angled away from the virtual plane. The third first-ramp portion faces and is angled toward the virtual plane. The first second-ramp portion faces and is angled toward the virtual plane, and the second second-ramp portion faces and is angled away from the virtual plane. In the direction along the virtual plane, the first second-ramp portion extends further than the first first-ramp portion and terminates at a location relative to the plane, the location comprising a location at which the second second-ramp portion also terminates, and the third first-ramp portion extends further than the second second-ramp portion.

The following portion of this paragraph delineates example 2 of the subject matter, disclosed herein. According to example 2, which encompasses example 1, above, the first first-ramp portion, second first-ramp portion, and third first-ramp portion are contiguous, and the first second-ramp portion and the second second-ramp portion are contiguous.

The following portion of this paragraph delineates example 3 of the subject matter, disclosed herein. According to example 3, which encompasses example 1 or 2, above, the first first-ramp portion has a length greater than a length of the second first-ramp portion.

The following portion of this paragraph delineates example 4 of the subject matter, disclosed herein. According to example 4, which encompasses any one of examples 1-3, above, the first second-ramp portion has a length greater than a length of the second second-ramp portion.

The following portion of this paragraph delineates example 5 of the subject matter, disclosed herein. According to example 5, which encompasses any one of examples 1-4, above, the first first-ramp portion has a length greater than the first second-ramp portion.

The following portion of this paragraph delineates example 6 of the subject matter, disclosed herein. According to example 6, which encompasses any one of examples 1-5, above, the first first-ramp portion initiates at the first-ramp receiving end and extends away from the first-ramp receiving end and the first second-ramp portion initiates at the second-ramp receiving end and extends away from the second-ramp receiving end.

The following portion of this paragraph delineates example 7 of the subject matter, disclosed herein. According to example 7, which encompasses any one of examples 1-6, above, the second first-ramp portion is substantially parallel to the first second-ramp portion, and the second second-ramp portion is substantially parallel to the third first-ramp portion.

The following portion of this paragraph delineates example 8 of the subject matter, disclosed herein. According to example 8, which encompasses any one of examples 1-7, above, the ramp support includes: a third second-ramp portion, a fourth first-ramp portion, a first gap between the second first-ramp portion and the first second-ramp portion, a second gap between the third first-ramp portion and the second second-ramp portion, and a third gap between the third second-ramp portion and the fourth first-ramp portion. Each of the first gap, the second gap, and the third gap are substantially constant in a direction along the virtual plane.

The following portion of this paragraph delineates example 9 of the subject matter, disclosed herein. According to example 9, which encompasses any one of examples 1-8, above, an angle of the first first-ramp portion relative to the virtual plane is substantially equivalent to an angle of the first second-ramp portion relative to the virtual plane. An angle of the second first-ramp portion relative to the plane is substantially equivalent to an angle of the first second-ramp portion relative to the plane. An angle of the third first-ramp portion relative to the plane is substantially equivalent to an angle of the second second-ramp portion relative to the plane.

The following portion of this paragraph delineates example 10 of the subject matter, disclosed herein. According to example 10, which encompasses any one of examples 1-9, above, the second first-ramp portion is offset laterally from the first first-ramp portion in a direction along the virtual plane.

The following portion of this paragraph delineates example 11 of the subject matter, disclosed herein. According to example 11, which encompasses any one of examples 1-10, above, the first-ramp surface is configured to receive a convex portion of a suspension tab of a read-write head assembly of the magnetic storage device, and the second-ramp surface is configured to receive a convex portion of a second suspension tab of a second read-write head assembly of the magnetic storage device.

The following portion of this paragraph delineates example 12 of the subject matter, disclosed herein. According to example 12, a magnetic storage device includes a number of disks rotatable about a first axis and a ramp support configured to receive a number of read-write head assemblies that are rotated radially outward from the disks. The ramp support includes a first ramp. The first ramp includes a first-ramp receiving end and a first-ramp surface. The first-ramp surface includes a first first-ramp portion, a second first-ramp portion, and a third first-ramp portion. The ramp support includes a second ramp. The second ramp includes an end offset laterally from the end of the first ramp in a direction along a virtual plane that is interposed between the first ramp and the second ramp and extends radially outward from the first axis. The second ramp includes a second-ramp surface. The second-ramp surface includes a first second-ramp portion and a second second-ramp portion. In the direction along the virtual plane, the first first-ramp portion faces and is angled toward the virtual plane, the second first-ramp portion faces and is angled away from the virtual plane, the third first-ramp portion faces and is angled toward the virtual plane, the first second-ramp portion faces and is angled toward the virtual plane, and the second second-ramp portion faces and is angled away from the virtual plane.

The following portion of this paragraph delineates example 13 of the subject matter, disclosed herein. According to example 13, which encompasses example 12 above, each read-write head assembly of the number of read-write head assemblies includes a read-write head assembly of a carriage arm of a number of carriage arms. Each carriage arm of the number of carriage arms includes a first read-write head assembly. The first read-write head assembly includes a suspension tab of the first read-write head assembly and a first slider. Each carriage arm of the number of carriage arms includes a second read-write head assembly. The second read-write head assembly includes a suspension tab of the second read-write head assembly and a second slider. The magnetic storage device is configured to move each slider and suspension tab in a direction parallel to the virtual plane. The first ramp and the second ramp are positioned such that the suspension tab of the first read-write head assembly contacts the first first-ramp portion at a first time and the suspension tab of a second read-write head assembly contacts the first second-ramp portion at a second time that is different than the first time.

The following portion of this paragraph delineates example 14 of the subject matter disclosed herein. According to example 14, which encompasses any one of examples 12-13, above, the end of the second ramp is offset from the end of the first ramp by a distance of no less than 0.1 millimeters ("mm") and no greater than 0.3 mm.

The following portion of this paragraph delineates example 15 of the subject matter, disclosed herein. According to example 15, which encompasses any one of examples 12-14, above, the second-ramp surface includes a first second-ramp surface. The second ramp further includes a second second-ramp surface opposite the first second-ramp surface. The second second-ramp surface faces a disk of the number of disks, the disk received by a portion of the ramp support.

The following portion of this paragraph delineates example 16 of the subject matter, disclosed herein. According to example 16, which encompasses any one of examples 12-15, above, the first-ramp surface is a first first-ramp surface. The first ramp further includes a second first-ramp surface opposite the first first-ramp surface. The second first-ramp surface faces a disk of the number of disks, the disk received by a portion of the ramp support.

The following portion of this paragraph delineates example 17 of the subject matter, disclosed herein. According to example 17, which encompasses any one of examples 12-16, above, the ramp support further includes a plurality of first ramps and a plurality of second ramps separated into a plurality of sets each including a corresponding one of the plurality of first ramps and a corresponding one of the plurality of second ramps. At least one set of the plurality of sets includes a second ramp and a first ramp positioned above the second ramp in a direction that is substantially parallel to the first axis and at least one other set of the plurality of sets includes a second ramp and a first ramp positioned below the second ramp in a direction that is substantially parallel to the first axis.

The following portion of this paragraph delineates example 18 of the subject matter, disclosed herein. According to example 18, which encompasses any one of examples 12-17, above, the first-ramp surface receives a convex portion of a first suspension tab of a first read-write head assembly of the number of read-write head assemblies, and the second-ramp surface receives a convex portion of a second suspension tab of a second read-write head assembly of the number of read-write head assemblies.

The following portion of this paragraph delineates example 19 of the subject matter disclosed herein. According to example 19, a method of unloading read-write head assemblies from disks of a magnetic storage device includes rotating the read-write head assemblies toward a ramp support. As the read-write head assemblies are rotated, the method includes contacting a suspension tab of a first read-write head assembly of the read-write head assemblies with a first-ramp surface of a first ramp of the ramp support and sliding a suspension tab of the first read-write head assembly along a first first-ramp portion of the first-ramp surface to move a read-write head of the first read-write head assembly away from a first disk. The method includes, as the read-write head assemblies are rotated, contacting a suspension tab of a second read-write head assembly with a second-ramp surface of a second ramp of the ramp support and sliding the suspension tab of the second read-write head assembly along a first second-ramp portion of the second-ramp surface to move the first read-write head away from the first disk. Contacting the suspension tab of the second read-write head assembly with the second-ramp surface is subsequent to contacting the suspension tab of the first read-write assembly with the first-ramp surface. The method includes, while the read-write head assemblies are rotated, moving the suspension tab of the first read-write head assembly along a second first-ramp portion concurrently with moving the suspension tab of the second read-write head assembly along the first second-ramp portion to move the read-write head toward the first disk. The method includes, while the read-write head assemblies are rotated, moving the suspension tab of the first read-write head assembly along a third first-ramp portion concurrently with moving the suspension tab of a second read-write head assembly along a second second-ramp portion to move the read-write head away from the first disk.

The following portion of this paragraph delineates example 20 of the subject matter, disclosed herein. According to example 20, which encompasses example 19 above, the method includes moving the suspension tab of the first read-write head assembly along a fourth first-ramp portion that is substantially parallel to the first disk and concurrently moving the suspension tab of the second read-write head assembly along a third second-ramp portion that is substantially parallel to the first disk.

The following portion of this paragraph delineates example 21 of the subject matter, disclosed herein. According to example 21, which encompasses any of examples 19-20 above, the first ramp and the second ramp includes consecutive ramps on the ramp support in a plane substantially parallel to an axis of a number of disks of the magnetic storage device.

The following portion of this paragraph delineates example 22 of the subject matter, disclosed herein. According to example 22, which encompasses any of examples 19-21 above, rotating the read-write head assemblies includes rotating each read-write head assembly of the read-write head assemblies at a substantially uniform speed.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
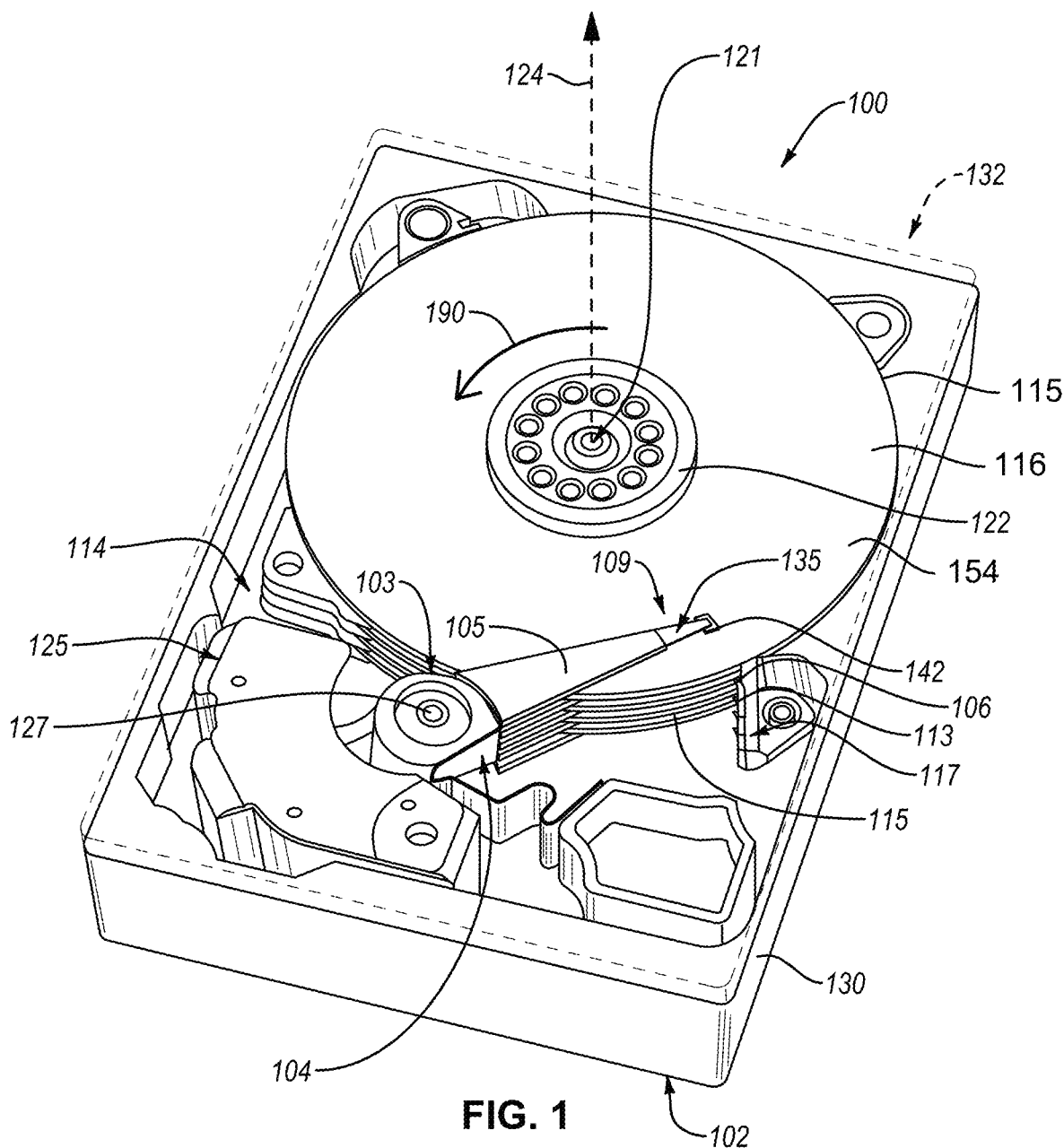
FIG. 1 is a perspective view of a magnetic storage device, according to one or more examples of the present disclosure.

Referring to FIG. 1, a magnetic storage device 100, according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

The magnetic storage device 100 includes various features located within the interior cavity 114 of the housing 102. In some examples, the magnetic storage device 100 includes a carriage 103, disks 115, a spindle motor 121, and a voice coil magnetic (VCM) actuator 125 within the interior cavity 114. The carriage 103 includes a plurality of carriage arms 105 and at least one read-write head assembly 110 coupled to the distal tip of each arm of the plurality of carriage arms 105. In some examples, two read-write head assemblies 110 are coupled to the distal tip of each carriage arm of the plurality of carriage arms 105. Each read-write head assembly 110 is positioned proximate to an end 109 of a suspension assembly and includes a suspension arm 135, a slider 142, and at least one read-write head 148. Although not shown, each read-write head assembly 110 can include at least one gimbal. The gimbal movably couples the suspension arm 135, the slider 142, and the at least one read-write head 148 to a corresponding one of the carriage arms 105. Although the magnetic storage device 100 is shown to have five carriage arms 105 and four disks 115 in the example of FIG. 1 and twelve disks 115 in the examples of FIGS. 4 and 5, in other examples the magnetic storage device 100 can have fewer than five carriage arms 105, fewer than four disks 115, more than nine carriage arms 105, more than eight disks 115, between 6-8 carriage arms 105, or between 5-7 disks 115. Each side of each carriage arm 105 facing a disk 115 has a read-write head assembly 110. For example, each of bottom and top carriage arms 105 has one read-write head assembly 110 and each of middle carriage arms 105, between the bottom and top carriage arms 105, has two read-write head assemblies 110. Similarly, although the magnetic storage device 100 is shown to have one spindle motor 121 and one VCM actuator 125, in other examples, the magnetic storage device 100 can have any number of spindle motors 121 and VCM actuators 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis 124 of each disk 115. The spindle motor 121 can be operatively controlled to rotate the disks 115, in a rotational direction 190, a controlled amount at a controlled rate.

Each of the disks 115 may be any of various types of magnetic recording media. Generally, in one example, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk 115 is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM actuator 125 electromagnetically engages voice coils of the carriage arms 105 to rotate the carriage arms 105, and the read-write head assemblies 110, which are coupled to the carriage arms 105, relative to the disks 115 in a rotational direction along a plane parallel to read-write surfaces 154 of the disks 115. The carriage arms 105 can be rotated to position the read-write head 148 of the read-write head assemblies 110 over a specified radial area of the read-write surface 154 of a corresponding disk 115 for read and/or write operations. The VCM actuator 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM actuator 125.

The carriage arms 105 are non-movably fixed to and extend away from a base of the carriage 103 in a spaced-apart manner relative to each other. In some implementations, adjacent one of the carriage arms 105 are spaced an equal-distance apart from each other and extend parallel relative to each other. A respective one of the disks 115 is positioned between adjacent carriage arms 105. In an idle mode (e.g., when read-write operations are not being performed), the VCM actuator 125 is actuated to rotate the carriage arms 105, in a radially outward direction relative to the disks 115, such that the read-write head assemblies 110 are parked or unloaded onto a ramp support 117 secured to the base 130. In the parked position, each carriage arm 105 and read-write head 148 rests between two ramps (e.g., ramps 106 and 113) of the ramp support 117. The ramp support 117 is described in further detail herein in connection with FIGS. 2-5. The ramp support 117 includes a number of ramps, including ramps 106 and 113. Ramps 306 and 313 of FIGS. 3A-E are embodiments of ramps 106 and 113.

Each read-write head 148 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each read-write head assembly 110, the electrical signals are transmitted from and to the read-write head 148 via electrical traces or lines formed in or coupled to the slider 142, suspension arm 135, and carriage arm 105. The electrical traces of the slider 142, suspension arm 135, and carriage arm 105 are electrically interconnected to facilitate transmission of electrical signals between the read-write head 148 and a flex connector 104 of the magnetic storage device 100, which is in communication with a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. As is described in more detail below, solder weldments are utilized to electrically connect corresponding electrical contact pads (and corresponding electrical traces) of the slider 142 and the suspension arm 135.

Although not shown, the read-write head assembly 110 also includes a head actuator selectively operable to move the read-write head 148 relative to the carriage arm 105. The head actuator selectively moves the read-write head 148 in any of various manners and in any of various directions. For example, the head actuator can be configured to move the read-write head 148 linearly in any of various directions, such as in one or more of a first sideways direction, a second sideways direction, a forward direction, and a backward direction, along a plane parallel to the read-write surface 154 of the disk 115. As another example, the head actuator may be, alternatively or additionally, configured to move the read-write head 148 linearly in any of various directions, such as an upward direction and a downward direction, along a plane perpendicular to the read-write surface 154 of the disk 115. Further, in some implementations, the head actuator may be, alternatively or additionally, configured to move the read-write head 148 rotationally in any of various rotational directions along planes parallel to and/or perpendicular to the read-write surface 154 of the disk 115. The head actuator can be any of various actuators known in the art, such as, for example, so-called electrically-controlled micro-actuators and milli-actuators (e.g., piezo-electric actuators).

The suspension arm 135 of the read-write head assembly 110 is softer and more flexible than the carriage arm 105 to promote resilient support of the slider 142 relative to the carriage arm 105. For example, in some implementations, the suspension arm 135 is flexible to flex away from the read-write surface 154 of the disk 115 to allow the slider 142 move away from the read-write surface 154 of the disk 115, such as when an air bearing is formed between the read-write surface 154 and the slider 142 as the disk 115 spins relative to the read-write head assembly 110. The suspension arm 135 can have a generally thin, sheet-like, construction and taper from carriage arm 105 to the slider 142. The slider 142 is coupled to a distal end portion of the suspension arm 135 such that the suspension arm 135 is positioned between or separates the slider 142 from the carriage arm 105. In this manner, the slider 142 is distally spaced apart from the carriage arm 105 via the suspension arm 135. The suspension arm 135 is either directly or indirectly coupled to the carriage arm 105. The suspension arm 135 can be made of any of various materials, such as metals, composites, plastics, and the like.

According to some examples, the suspension arm 135 is directly coupled to the carriage arm 105. In such examples, the suspension arm 135 is non-movably fixed to the carriage arm 105. In other words, although the suspension arm 135 may flex to move portions of the suspension arm 135 relative to the carriage arm 105, the portion of the suspension arm 135 immediately affixed to the carriage arm 105 does not move relative to the carriage arm 105. The suspension arm 135 can be non-movably fixed to the carriage arm 105 via any of various coupling techniques, such as fastening, bonding, adhering, welding, and the like.

In contrast, in certain examples, the suspension arm 135 is indirectly coupled to the carriage arm 105. In such examples, the suspension arm 135 can be non-movably fixed to carriage arm 105 or movably fixed to the carriage arm 105. According to some implementations, the suspension arm 135 is movably fixed to the carriage arm 105 via a suspension arm actuator (not shown). The suspension arm actuator movably couples a proximal end of the suspension arm 135, and thus the entire suspension arm 135, to the distal end of the carriage arm 105. The suspension arm actuator is configured to selectively move the suspension arm 135 relative to the carriage arm 105. More specifically, as an example, the suspension arm actuator selectively rotates the suspension arm 135, and thus the slider 142, relative to the carriage arm 105, in rotational directions along a plane parallel to the read-write surface 154 of the disk 115. The suspension arm actuator can be any of various actuators known in the art, such as, for example, so-called electrically-controlled micro-actuators and milli-actuators.

The magnetic storage device 100 includes a ramp support 117. The ramp support 117 includes load/unload ramps (e.g., ramps 106 and 113). As described herein, the ramps 106 and 113 are stacked on the ramp support 117 in a direction substantially perpendicular to the surfaces 116 of the disks 115. The ramps 106 and 113 include one or more sloped portions (e.g., portions 309, 311, 312, 320, and 323 in FIGS. 3A-E) to help move the read-write heads 148 off and/or onto the disks 115. The carriage arms 105 are moved so that the read-write heads 148 move into and out of the ramp support 117 via the ramps 106 and 113 depending on the operating mode of the magnetic storage device 100. When the magnetic storage device 100 transitions from a read-write mode to an idle mode, for example, the read-write heads 148 move away from the disks 115 and into the ramp support 117.

Figure 2A:
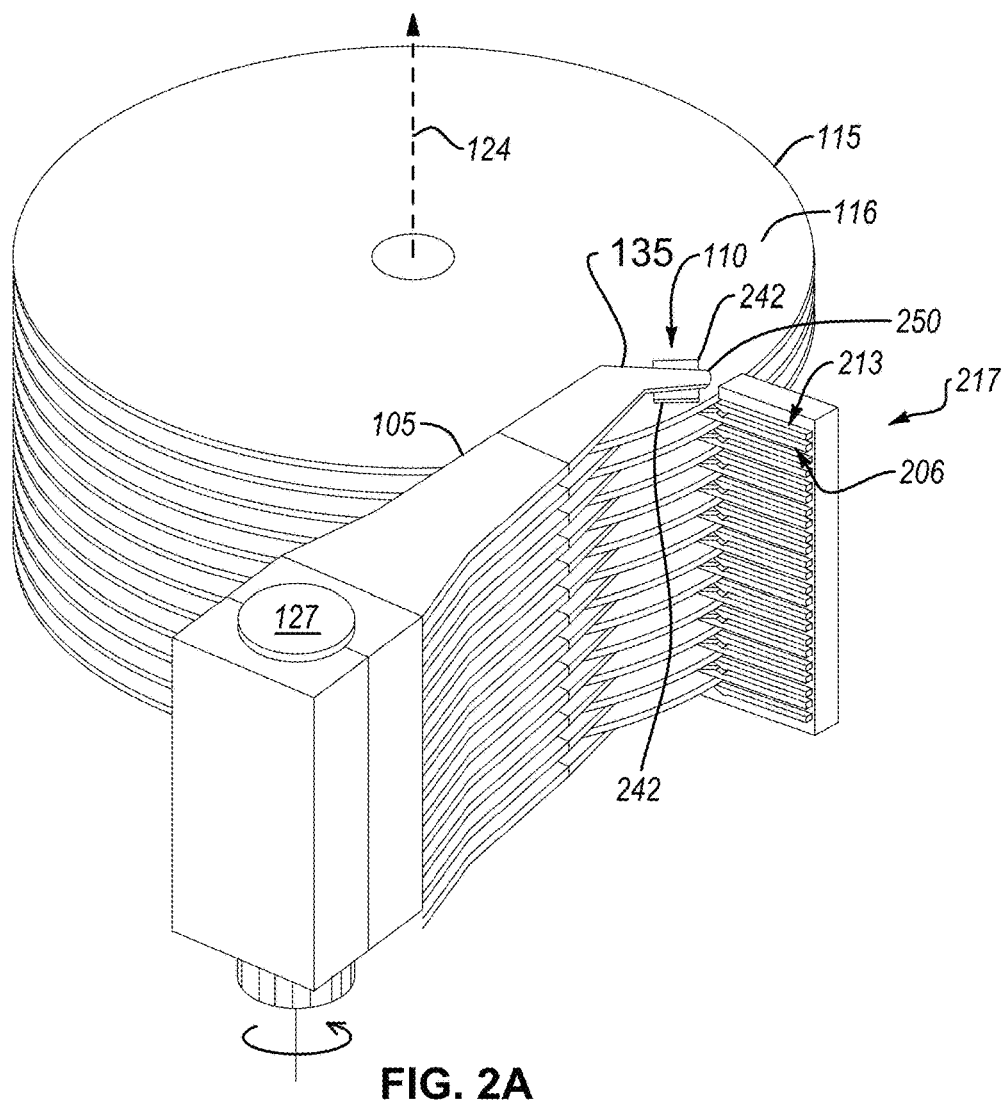
FIG. 2A is a perspective view of a ramp support of a magnetic storage device, according to one or more examples of the present disclosure.
Figure 2B:
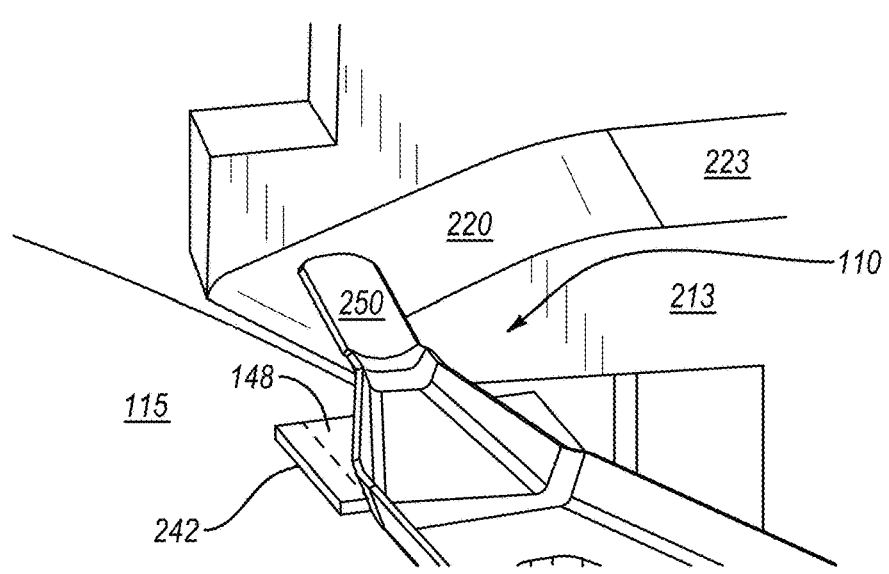
FIG. 2B is a perspective view of a suspension tab of a read-write head assembly of a magnetic storage device, according to one or more examples of the present disclosure.

As shown in FIG. 2B, each carriage arm 105 includes at least one read-write head assembly 110. As shown in FIG. 2B, the top carriage arm 105 includes only one read-write head assembly 110, which includes one slider 242 that supports a read-write head, such as read-write head 148 shown in FIGS. 3A-E (also see, e.g., sliders 342 in FIGS. 3A-E). Although not shown in FIG. 2B, the carriage arms 105 between the top carriage arm and the bottom carriage arm include two read-write head assemblies 110 each. For example, sliders 342 of FIGS. 3A-E each belong to a different read-write assembly of the same carriage arm 105, in some embodiments.

Each read-write head assembly 110 also includes a suspension tab 250 that facilitates loading of the read-write head assembly 110 onto the ramp support 217. The suspension tab 250 of each carriage arm 105 fits into a space between and slides along a corresponding one of a first ramp 206 and a second ramp 213 of multiple sets of first ramps 206 and second ramps 213 of the ramp support 217. The first ramp 206 and the second ramp 213 guide the suspension tabs 250 as they move radially outward relative to the disks 115 so that the read-write heads 148 corresponding with the suspension tabs 250 are moved into a parked position associated with the magnetic storage device 100 being in an idle state.

The ramp support 217 is configured to receive a plurality of read-write head assemblies 110, which are synchronously rotated radially outward from the disks 115 into the ramp support 217. In some examples, each carriage arm 105 includes two read-write head assemblies 110 each configured to read data from and write data to a corresponding one of two adjacent disks. Referring to FIGS. 3A-3E, which shows an example of a ramp support 317 having a first ramp 306 and a second ramp 313. The ramp support 317 is one implementation of the ramp support 217 of FIGS. 2A and 2B. The ramp support 317 can be used with a carriage arm assembly having multiple carriage arms 105 each supporting two read-write head assemblies each having a suspension tab (e.g., suspension tabs 349 and 350) and a slider (e.g., sliders 342 in Figures). Herein, the suspension tab of a first read-write head assembly of a carriage arm may be referred to as "first suspension tab" (e.g., first suspension tab 349). Similarly, the suspension tab of a second read-write head assembly of the carriage arm may be referred to herein as a "second suspension tab" (e.g., second suspension tab 350). Accordingly, as shown in FIGS. 3A-3E, the first suspension tab 349 is the suspension tab of a read-write head assembly on a first side of a carriage arm (e.g., carriage arm 105) and the second suspension tab 350 is the suspension tab of a read-write head assembly on an opposite side of the carriage arm. In some examples, the first suspension tab 349 and the second suspension tab 350 are flexible with respect to the carriage arm, such that the first suspension tab 349 and the second suspension tab 350 are movable towards each other as they contact and move along the first ramp 306 and the second ramp 313, in a radially outward direction towards an idle position, and are movable away from each other as they move along the first ramp 306 and the second ramp 313, in a radially inward direction towards a read-write position.

Each suspension tab 349 and 350 is curved and includes a convex portion 364 and 362, respectively. Additionally, in some examples, each suspension tab 349 and 350 includes a concave portion on an opposite side of the corresponding suspension tab as the convex portion 364 and 362. Accordingly, in cross-section, each suspension tab 349 and 350 can have a semi-circular or arc shape. The convex portions 364 and 362 of the suspension tabs 349 and 350 contact the ramp surfaces 308 and 319, respectively, to help promote continuous contact between the suspension tabs 349 and 350 and the surfaces 308 and 319 of the ramps 306 and 313 as the suspension tabs 349 and 350 slide along the surfaces 308 and 319 of the ramps 306 and 313. The read-write head assemblies 110 of a particular carriage arm 105 are positioned such that the first suspension tab 349 faces and is substantially aligned with the second suspension tab 350.

Figure 3A:
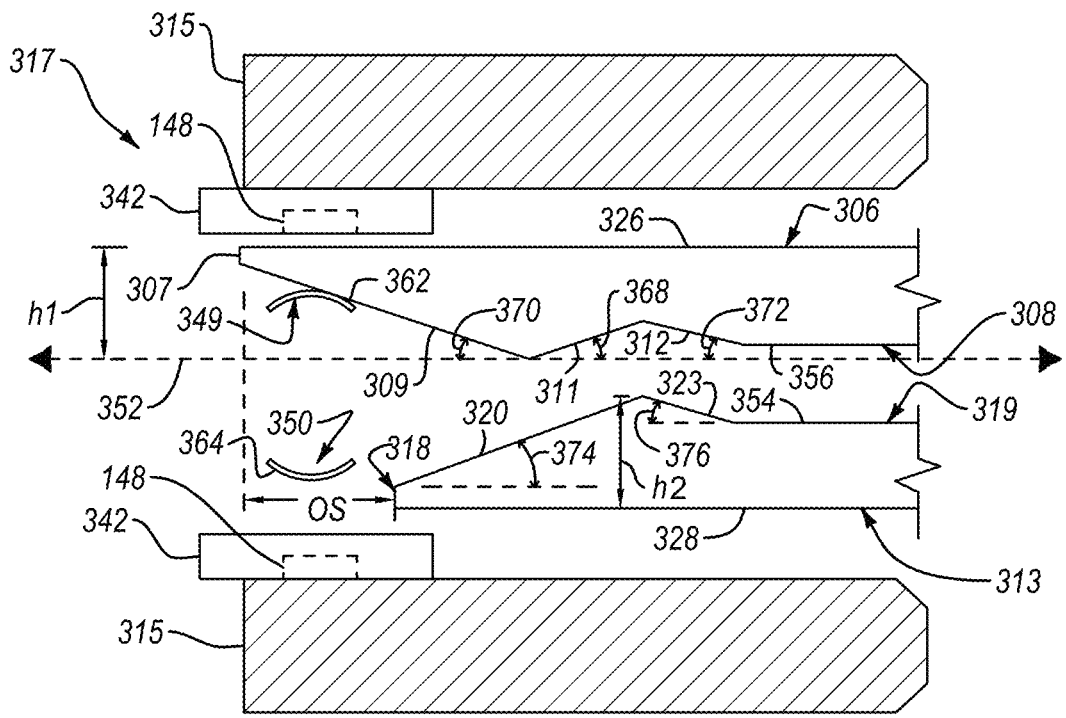
FIGS. 3A-E are cross-sectional side elevation views of a ramp support of a magnetic storage device, where each Figure shows a read-write head assembly in a different position relative to the ramp support as the read-write head assembly is offloaded from a disk of the magnetic storage device, according to one or more examples of the present disclosure.

In certain examples, each one of the ramp support 117, the ramp support 217, and the ramp support 317 includes sets of pairs of ramps. As shown in FIGS. 2A and 3A, in some examples, a pair of ramps includes a first ramp (e.g., the first ramp 306) and a second ramp (e.g., the second ramp 313). The magnetic storage device 100 moves each read-write head assembly 110 in a direction substantially perpendicular to the axis of rotation 124 of the disks 115 and/or substantially parallel to a virtual plane 352 that is perpendicular to the axis of rotation 124 and located between the first ramp 306 and the second ramp 313 (see, e.g., the virtual plane 352 of FIGS. 3A-3E). The virtual plane 352 extends radially outward from the axis of rotation 124.

The quantity of ramps of the ramp support 117 is proportional to the quantity of disks in the stack of disks 115. Moreover, the data capacity of the magnetic storage device 100 is proportional to the quantity of the disks 115. As more disks 115 are added to the magnetic storage device 100 to increase capacity of the magnetic storage device 100, the ramp support 117 must be designed to have more ramps. Examples of the present disclosure enable the ramp support 117 of the present disclosure to have more ramps (e.g., more sets of ramps) within a conventional form factor than conventional devices, and enable the magnetic storage device 100 to hold more disks 115 while staying within the conventional form factor. In other words, the ramp support 117 of the present disclosure enables a narrowing of the spacing between disks 115. This facilitates the addition of disks 115 to the magnetic storage device 100, which helps to improve storage capacity. Moreover, examples of the present disclosure enable the addition of more disks 115 into the device while preserving a suspension tab lift up height (h1 and h2 in FIGS. 3A-E), defined as a maximum distance between a first surface of a ramp (e.g., first first-ramp surface 308 or first second-ramp surface 319 of FIGS. 3A-E) and a second surface of the same ramp that is opposite to the first ramp surface (e.g., second first-ramp surface 326 and second second-ramp surface 328 in FIGS. 3A-E). In some examples, the distance defining the suspension tab lift up height is a distance in a direction that is substantially perpendicular to a virtual plane 352 disposed between ramps of the ramp support (e.g., virtual plane 352 in FIGS. 3A-E). Examples of the present disclosure include ramp supports (e.g., ramp supports 217, 317, 417, and 517) with a high enough number of ramps (e.g., ramps 431 and 531) to support twelve disks 115 or more.

Referring to FIGS. 3A-3E, the first ramp 306 includes a first-ramp receiving end 307. The first-ramp receiving end 307 is the end of the first ramp 306 that is positioned in closer proximity to the rotational axis 124 of the disks 115 than any other end or portion of the first ramp 306.

The second ramp 313 includes a second-ramp receiving end 318 that is offset laterally (e.g., radially relative to the rotational axis 124) from the first-ramp receiving end 307 in a direction along the virtual plane 352 away from the rotational axis 124. Due to the offset (OS), the first-ramp receiving end 307 is closer to the rotational axis 124 than the second-ramp receiving end 318. Additionally, the suspension tabs 349 and 350 are aligned and co-move together. Hence, the suspension tab 349 contacts the first ramp 306 before the suspension tab 350 contacts the second ramp 313. In some examples, the distance between the axis of rotation 124 of the disks 115 and the second-ramp receiving end 318 is greater than the distance between the axis of rotation 124 of the disks 115 and the first-ramp receiving end 307 due to the offset. In some examples, the second-ramp receiving end 318 is offset (OS) from the first-ramp receiving end 307 by a distance of no less than 0.1 millimeters ("mm") and no greater than 0.3 mm. For example, the second-ramp receiving end 318 can be offset from the first-ramp receiving end by a distance of approximately 0.2 millimeters.

Offsetting the first-ramp receiving end 307 and the second-ramp receiving end 318 from each other helps to provide more flexibility in configurations of the first ramp 306 and the second ramp 313. For example, the first ramp 306 and the second ramp 313 can be configured to help shorten an axial distance between the ramps 306 and 313, in a direction that is substantially perpendicular to the virtual plane 352, or substantially parallel to the axis of rotation 124 of the disks.

As illustrated in FIGS. 3A-E, in some examples, the first ramp 306 includes a first-ramp surface 308. The first-ramp surface 308 includes a first first-ramp portion 309, a second first-ramp portion 311, a third first-ramp portion 312, and a fourth first-ramp portion 356. In some examples, the first first-ramp portion 309 initiates at the first-ramp receiving end 307 of the first ramp 306 and extends radially outward away from the first-ramp receiving end 307 of the first ramp 306. In some examples, each of the first first-ramp portion 309, the second first-ramp portion 311, and third first-ramp portion 312 are contiguous. In some examples, each of the first first-ramp portion 309, second first-ramp portion 311, the third first-ramp portion 312, and the fourth first-ramp portion 356 are substantially flat.

In some examples, the first first-ramp portion 309 has a length that is greater than a length of the second first-ramp portion 311. For example, the ratio of the length of the second first-ramp portion 311 to the length of the first first-ramp portion 309 is greater than 1 to 2.5 and less than 1 to 3.5. The length of the first first-ramp portion 309 is also greater than a length of the third first-ramp portion 312. In some examples, the length of the second first-ramp portion is greater than a length of the third first-ramp portion 312. As used herein, the term "length" describes a distance along a surface, such as the first first-ramp surface 308 or the first second-ramp surface 319.

As illustrated in FIGS. 3A-E, in some examples, the second ramp 313 includes a second-ramp surface 319. The second-ramp surface 319 includes a first second-ramp portion (e.g., 220 in FIG. 2B or 320 in FIGS. 3A-E), a second second-ramp portion (e.g., 223 in FIG. 2B or 323 in FIGS. 3A-E), and a third second-ramp portion 354. In some examples, the first second-ramp portion 320 initiates at the second-ramp receiving end 318 of the second ramp 313 and extends away from the second-ramp receiving end 318. In some examples, each of the first second-ramp portion 320, the second second-ramp portion 323, and the third second-ramp portion 354 are contiguous. In some examples, each of the first second-ramp portion 320, the second second-ramp portion 323, and the third second-ramp portion 354 are substantially flat.

In some examples, the first second-ramp portion 320 has a length that is greater than a length of the second second-ramp portion 323. In some examples, the first second-ramp portion 320 has a length of approximately 0.82 mm. In some examples, a ratio of a distance h2 between an end of the first second-ramp portion 320 and a second second-ramp surface 328 and the length of a second second-ramp portion 323 is between 1 and 2.5, in some examples, or between 1 and 3.5, in other examples. In some examples, the first second-ramp portion 320 extends further from the rotational axis 124 than the first first-ramp portion 309 in the direction along the virtual plane 352. As such, the first suspension tab 349 transitions from the first first-ramp portion to 309 to the second first-ramp portion 311 before the second suspension tab 350 transitions from the first second-ramp portion 320 to the second second-ramp portion 323. In some examples, the third first-ramp portion 312 extends further from the rotational axis 124 than the second second-ramp portion 323 in the direction along the virtual plane 352.

Although the first second-ramp portion 320 extends further than the first first-ramp portion 309 in the direction along the virtual plane 352, in some examples, the first second-ramp portion 320 has a total length that is less than the total length of the first first-ramp portion 309.

In some examples, the second first-ramp portion 311 is substantially parallel to the first second-ramp portion 320. In other words, the angle 368 of the second first-ramp portion 311 with respect to the virtual plane 352 is substantially equivalent to the angle 374 of the first second-ramp portion 320 with respect to the virtual plane 352. In some examples, the angle 368 of the second first-ramp portion 311, with respect to the virtual plane 352, and the angle 374 of the first second-ramp portion 320 are between 10 and 30 degrees, or approximately 20 degrees. In some examples, the angle 374 is approximately twice the angle 376 of the second second-ramp portion 323 with respect to the virtual plane 352. In some examples, the angle 376 of the second second-ramp portion 323 with respect to the virtual plane 352 is substantially equivalent to the angle 372 of the third first-ramp portion 312 with respect to the virtual plane 352. The second second-ramp portion 323 is substantially parallel to the third first-ramp portion 312. For example, the angle 372 of the third first-ramp portion 312 and the angle 376 of the second second-ramp portion 323 are each between 5 and 15 degrees, or approximately 10 degrees.

In some examples, the angle 370 of the first first-ramp portion 309 with respect to the virtual plane 352 is substantially equal to the angle 374 of the first second-ramp portion 320 and/or the angle 368 of the second first-ramp portion 311 with respect to the virtual plane 352. For example, the angle 370 of the first first-ramp portion and the angle 368 of the second first-ramp portion 311 are each approximately equal to 20 degrees.

In some examples, in the direction along the virtual plane 352, the first first-ramp portion 309 faces and is angled toward the virtual plane 352. The second first-ramp portion 311 faces and is angled away from the virtual plane 352, and the third first-ramp portion 312 faces and is angled toward the virtual plane 352. Each of the first first-ramp portion 309, the second first-ramp portion 311, the third first-ramp portion 312, and the fourth first-ramp portion 356 are contiguous, such that the suspension tab 349 moves continuously along the first first-ramp surface 308. In other words, the surface 319 has a zig-zag configuration.

In some examples, an angle 370 of the first first-ramp portion 309, with respect to the virtual plane 352, is greater than 10 degrees and less than 30 degrees away from the virtual plane 352. For example, the angle 370 is approximately 20 degrees. The fourth first-ramp portion 356 is not angled with respect to the virtual plane 352. In other words, the fourth first-ramp portion 356 is substantially parallel to the virtual plane 352.

In some examples, in the direction along the virtual plane 352, the first second-ramp portion 320 faces and is angled toward the virtual plane 352. The first second-ramp portion 320 also faces and is angled toward the first ramp 306. The second second-ramp portion 323 faces and is angled away from the virtual plane 352. The second second-ramp portion 323 also faces and is angled away from the first ramp 306. For example, the first second-ramp portion 320 is angled approximately 20 degrees toward the virtual plane 352.

The ramp support 317 includes a third second-ramp portion 354 and a fourth first-ramp portion 356. In some examples, the third second-ramp portion 354 is substantially parallel to the fourth first-ramp portion 356. Each of the third second-ramp portion 354 and the fourth first-ramp portion 356 is substantially parallel to the virtual plane 352, or substantially perpendicular to the axis of rotation 124 of the disks 115. When the read-write assemblies read-write are offloaded to the ramp support 317, the third second-ramp portion 354 and the fourth first-ramp portion 356 are the last portions of the ramp support 317 that the read-write head assemblies 110 contact until the read-write head assemblies 110 are loaded back onto the disks.

In some examples, a first gap 358 exists between the second first-ramp portion 311 and the first second-ramp portion 320. The first gap 358 is substantially constant along the lengths of the second first-ramp portion 311 and the first second-ramp portion 320. In some examples, this first gap 358 is greater than or equal to 0.2 millimeters ("mm") and less than or equal to 0.3 mm. For example, the first gap 358 is equal to approximately 0.22 millimeters ("mm").

In some examples, a second gap 360 exists between the third first-ramp portion 312 and the second second-ramp portion 323. The second gap 360 is substantially constant along the length of the shorter of the third first-ramp portion 312 and the second second-ramp portion 323. In some examples, the length of the third first-ramp portion 312 is substantially equal to the length of the second second-ramp portion 323. In some examples, the second gap 360 is approximately equal to the first gap 358. Hence, in some examples, the second gap 360 is greater than or equal to 0.2 mm and less than or equal to 0.3 mm. For example, the second gap 360 is equal to approximately 0.22 mm.

Due to the offset between the first ramp 306 and the second ramp 313, the first ramp 306 and the second ramp 313 are positioned such that the suspension tab 349 of the first read-write head assembly contacts, and begins to slide along the first first-ramp portion 309 prior to the suspension tab 350 of the second read-write head assembly contacting the first second-ramp portion 320. As further shown in FIGS. 3A-E, the suspension tab 349 of a read-write head assembly 110 contacts and slides along the first first-ramp portion 309, and then slides along each of the second first-ramp portion 311, the third first-ramp portion 312, and the fourth first-ramp portion 356 consecutively.

Figure 3B:
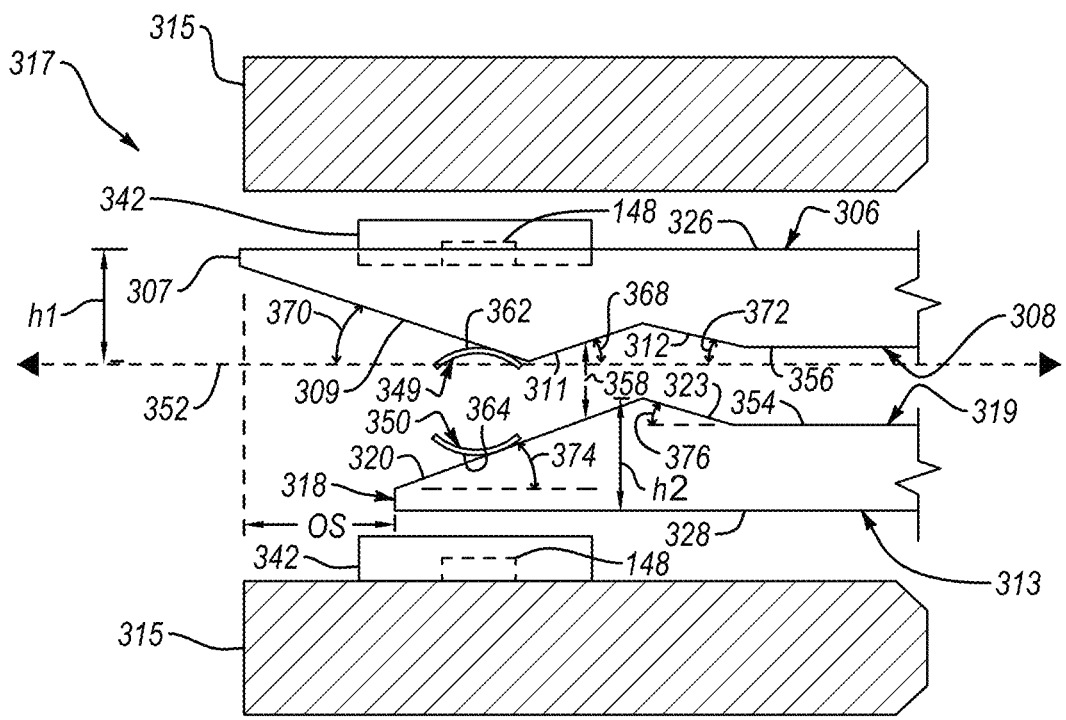

Then, as shown in FIG. 3B, after the suspension tab 349 contacts and at least partially slides along the first-ramp portion 309, eventually the suspension tab 350 contacts the first portion 320 of the second ramp 313. In some examples, as shown in FIG. 3B, the suspension tab 350 first contacts the first second-ramp portion 320 while the first suspension tab 349 is in contact with and sliding along the first first-ramp portion 309.

Because the sliders 342 are co-movable with the suspension tabs 349 and 352, the sliders 342 move in a direction substantially parallel to the virtual plane 352 as the suspension tabs 349 and 350 move along the surfaces 308 and 319 of the ramps 306 and 313.

Figure 3C:
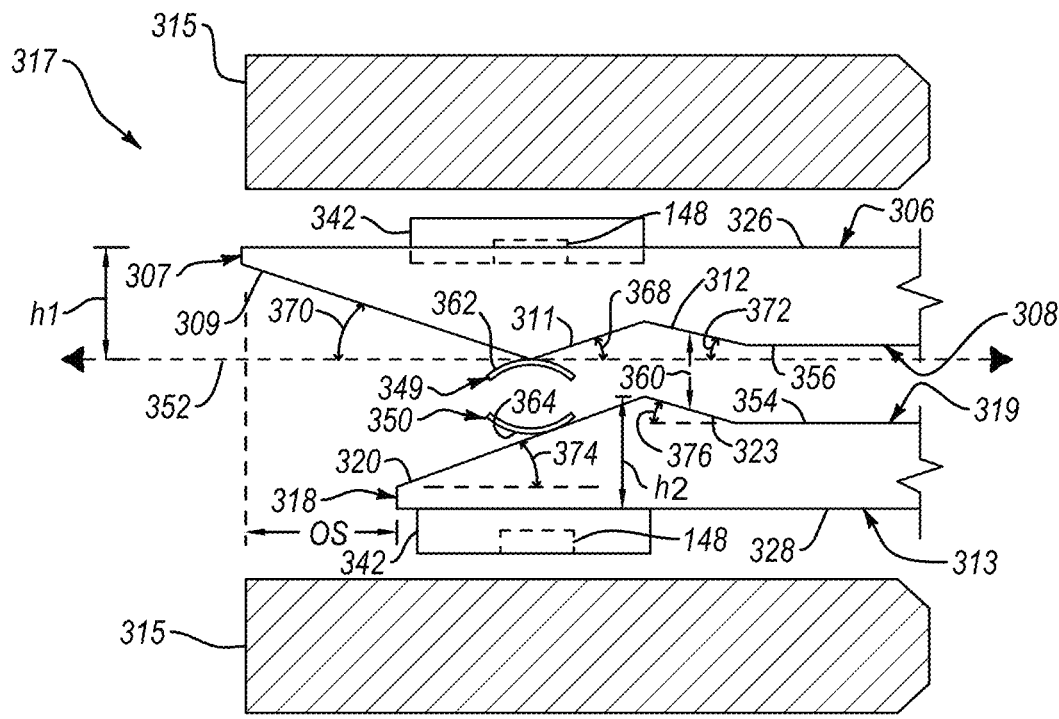

As shown in FIG. 3C, as the head assembly 110 continues to move, the first suspension tab 349 transitions onto the second first-ramp portion 311. At that time, the second suspension tab 350 is still in contact with and sliding along the first second-ramp portion 320. As shown in FIG. 3C, in some examples, the sliders 342 have each moved in a direction perpendicular to the virtual plane 352 such that each slider 342 is closer to a surface of the ramps 306 and 313, such as the second first-ramp surface 326 and the second second-ramp surface 328.

Figure 3D:
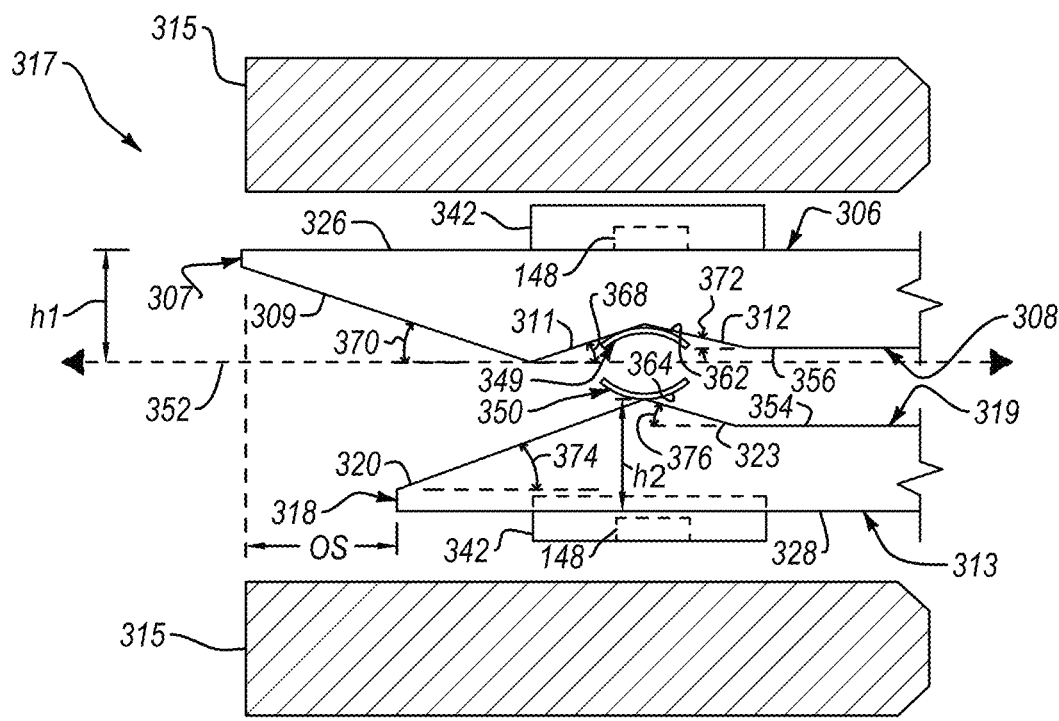

As shown in FIG. 3D, after the suspension tab 350 slides along the first second-ramp portion 320, further movement of the suspension tab 350 subsequently sliding along the second second-ramp portion 323. At approximately the same time that the second suspension tab 350 moves from the first second-ramp portion 320 to the second second-ramp portion 323, the first suspension tab moves from the second first-ramp portion 311 to the third first-ramp portion 312.

Figure 3E:
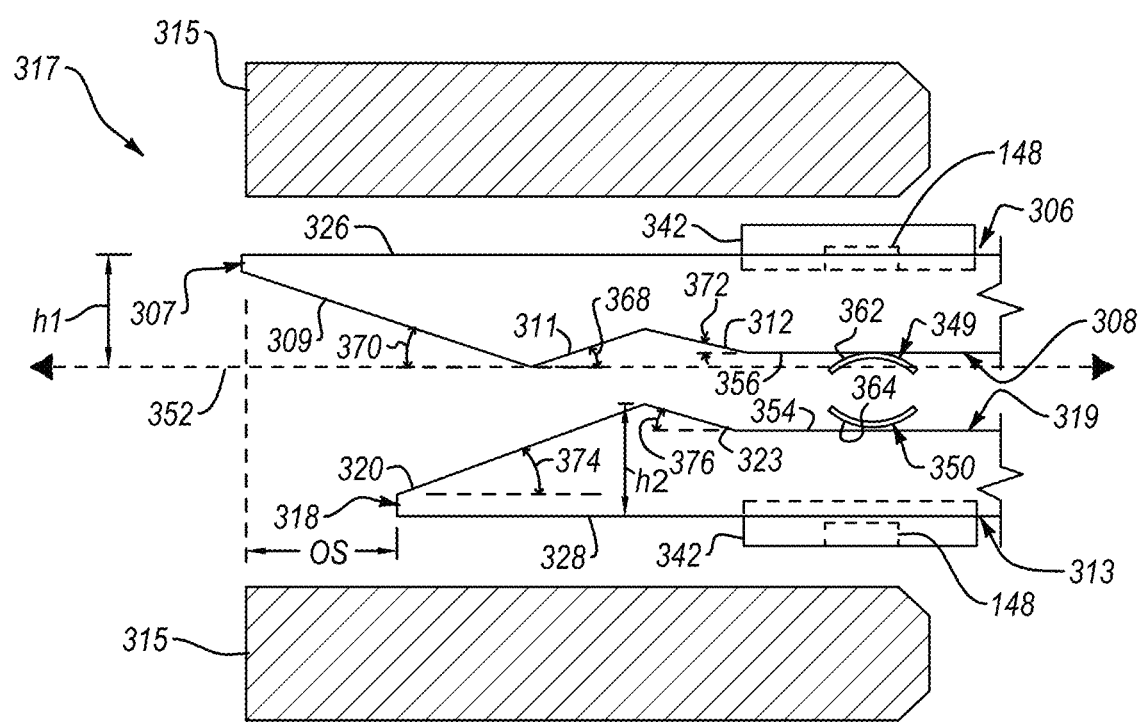

Finally, as shown in FIG. 3E, the read/write head assembly 110 moves into the parked or idle position. As shown in FIG. 3E, the first suspension tab 349 transitions from the third first-ramp portion 312 to the fourth first-ramp portion 356. The first suspension tab 349 remains in contact with and slides along the fourth first-ramp portion 356 until the read-write head assembly 110 reaches a parked position on the ramp support 317. Likewise, the second suspension tab 350 transitions from the second second-ramp portion 323 to the third second-ramp portion 354. The second suspension tab 350 remains in contact with and slides along the third second-ramp portion 354 until the read-write head assembly 110 reaches a parked position on the ramp support 317. In some examples, the parked position includes the read-write head assembly 110 resting proximate to an end of the first first-ramp surface 308 that is opposite to the first-ramp receiving end 307. The parked position includes the read-write head assembly 110 resting proximate to an end of the first second-ramp surface 319 that is opposite to the second-ramp receiving end 318. Each slider 342 moves with the suspension tabs 349, 350 in a direction parallel to the virtual plane 352 along a surface of the ramps 306 and 313 that is opposite the surface of the suspension tabs 349 and 350 (e.g., surfaces 326 and 328).

The second-ramp surface 319 is a first surface of the second ramp 313. As shown in FIG. 3A, the second ramp 313 also includes the second second-ramp surface 328. The second second-ramp surface 328 is on an opposite side of the second ramp 313 as the first second-ramp surface 319. The second second-ramp surface 328 faces a disk 115 received by a portion of the ramp support 117 (e.g., portion 429 of FIG. 4) and is substantially parallel to the disk 115. As such, the second second-ramp surface 328 faces a disk 115 and/or a portion of a disk 115, and the first second-ramp surface 319 faces the suspension tabs 349 and 350 of the read-write head assembly 110 being offloaded from the disk 115.

Additionally, the first-ramp surface 308, in some examples, is a first first-ramp surface. The first ramp 306 also includes a second first-ramp surface 326. The second first-ramp surface 326 is on an opposite side of the first ramp 306 as the first first-ramp surface 308. The second first-ramp surface 326 faces a disk 115 received by a portion 429 of the ramp support 317 and is substantially parallel to the disk 115. Meanwhile, the first first-ramp surface 308 faces the suspension tabs 349 and 350 of the read-write head assembly being offloaded from the disk 115. As the read-write head assembly 110 moves into the ramp support 317, the slider 342 of the read-write head assembly slides along the second first-ramp surface 326. The slider 342 remains substantially aligned with the suspension tab 349 in a direction parallel to the virtual plane 352 as the slider and the suspension tab 349 move into the ramp support 317.

Figure 4:
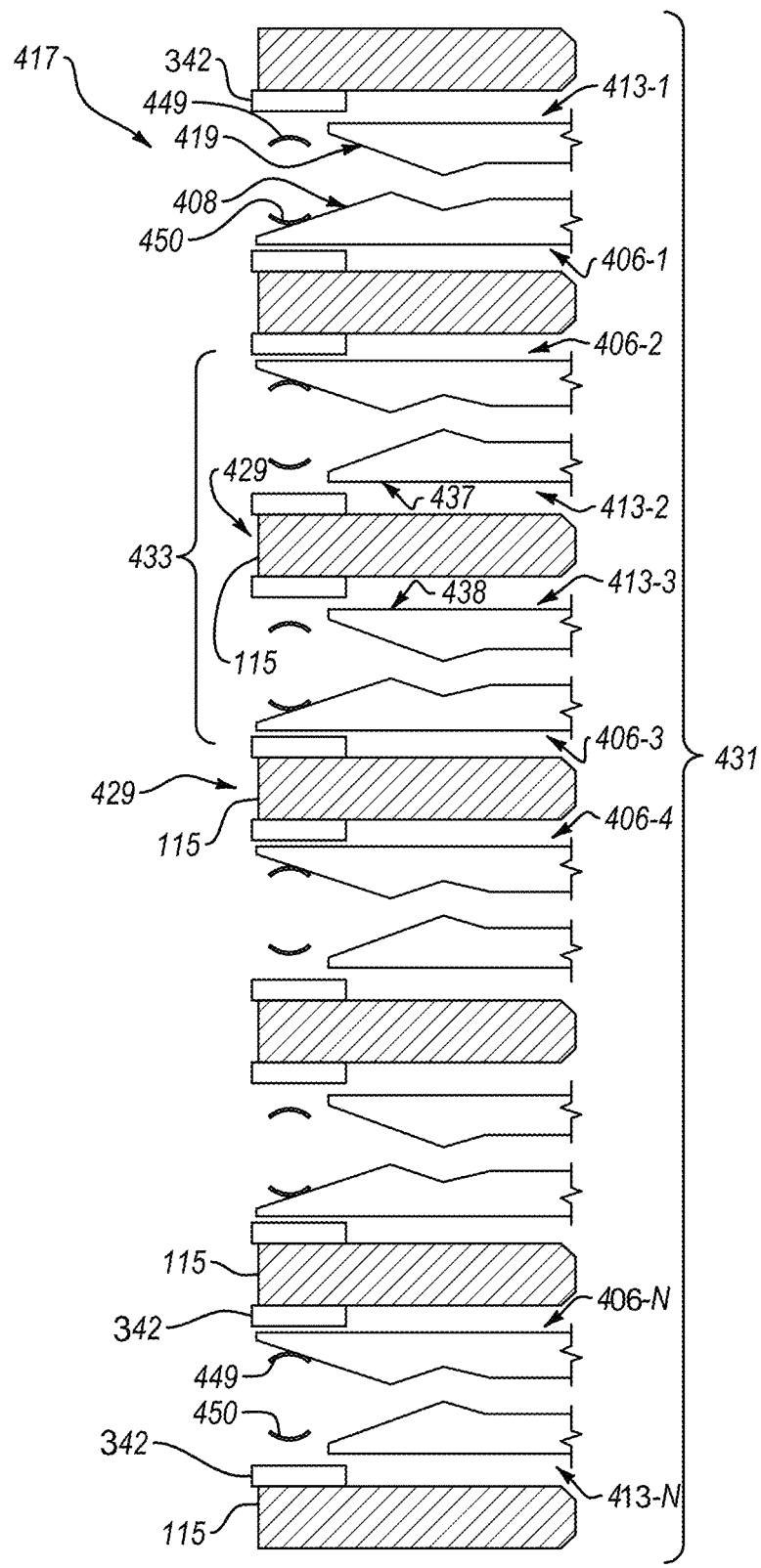
FIG. 4 is a cross-sectional side elevation view of an example of a ramp support having multiple ramps, according to one or more examples of the present disclosure.

Referring to FIG. 4, according to some examples, a ramp support 417 includes ramps 431. The ramps 431 include some ramps that are shaped similarly to the first ramp 306 and some ramps that are shaped similarly to the second ramp 313 described herein. Ramps 406-1, . . . , 406-N of FIG. 4 are shaped similarly to the ramps 306 of FIGS. 3A-E. Ramps 406-1, . . . , 406-N may be referred to herein as "long ramps." The ramp support 417 includes a plurality of ramps that are shaped substantially similarly to the second ramps 313 of FIGS. 3A-E. Ramps 413-1, . . . , 413-N of FIG. 4 are shaped similarly to ramps 313 in FIGS. 3A-E. Ramps 413-1, . . . , 413-N may be referred to as "short ramps."

In some examples, the long ramps 406-1, . . . , 406-N and the short ramps 413-1, . . . , 413-N are separated into a plurality of sets 433. Each set 433 includes at least one long ramp (e.g., 406-2) and at least one short ramp (e.g., 413-2). In some examples, in at least one set, the first ramp of the set 433 (e.g., 406-2) is positioned above the second ramp of the set 433 (e.g., 413-2) in a direction that is substantially parallel to the rotational axis 124 of the disks 115.

As shown in FIG. 4, the ramp support 417 includes a top ramp that is one of the plurality of short ramps 413-1, . . . , 413-N. The ramp support 417 is similar to the ramp support 217 and the ramp support 317. Directly below the top ramp is a ramp 406-1 that is one of the plurality of long ramps 406-1, . . . , 406-N. Although not shown in FIG. 4, because the end of the top short ramp 413-1 is offset laterally from the end of the top long ramp 406-1, which is below the top short ramp 413-1, when the carriage arms 105 are rotated towards the ramp support 417, a suspension tab 450 will contact the bottom long ramp 406-1 before a suspension tab 449 contacts the top short ramp 413-1.

At least one set 433 of ramps 431 includes a second long ramp 406-2 shaped substantially similar to the first long ramp 406-1. The set 433 includes two consecutive short ramps 413-2 and 413-3 that are shaped substantially similar to the top short ramp 413-1. The two consecutive short ramps 413-2 and 413-3 include substantially straight portions 437 and 438 that face each other. The set 433 of ramps are each configured to receive a disk (e.g., a disk 115) in the portion 429 between two consecutive ramps of similar shape. For example, a disk 115 is received in the portion 429 between the two consecutive short ramps 413-2 and 413-3. The ramp support 417 is also configured to receive a disk 115 in a portion 429 between two long ramps 406-1, . . . , 406-N. For example, the ramp support 417 is configured to receive a disk 115 in the portion 429 between a third long ramp 406-3 and a fourth long ramp 406-4.

In some examples, the ramp support 417 includes a sufficient number of ramps to accommodate 12 or more disks in the magnetic storage device 100. For example, the ramp support 417 includes a top short ramp 413-1, a top long ramp 406-1, and six sets 433 with two pairs of long ramps 406 and short ramps 413 in each set 433. Suspension tabs 449 and 450 contact the surfaces 408 and 419 of the ramps 431 such that a carriage arm 105 slides between each consecutive pair of long ramps 406-1, . . . , 406-N and short ramps 413-1, . . . , 413-N.

Figure 5:
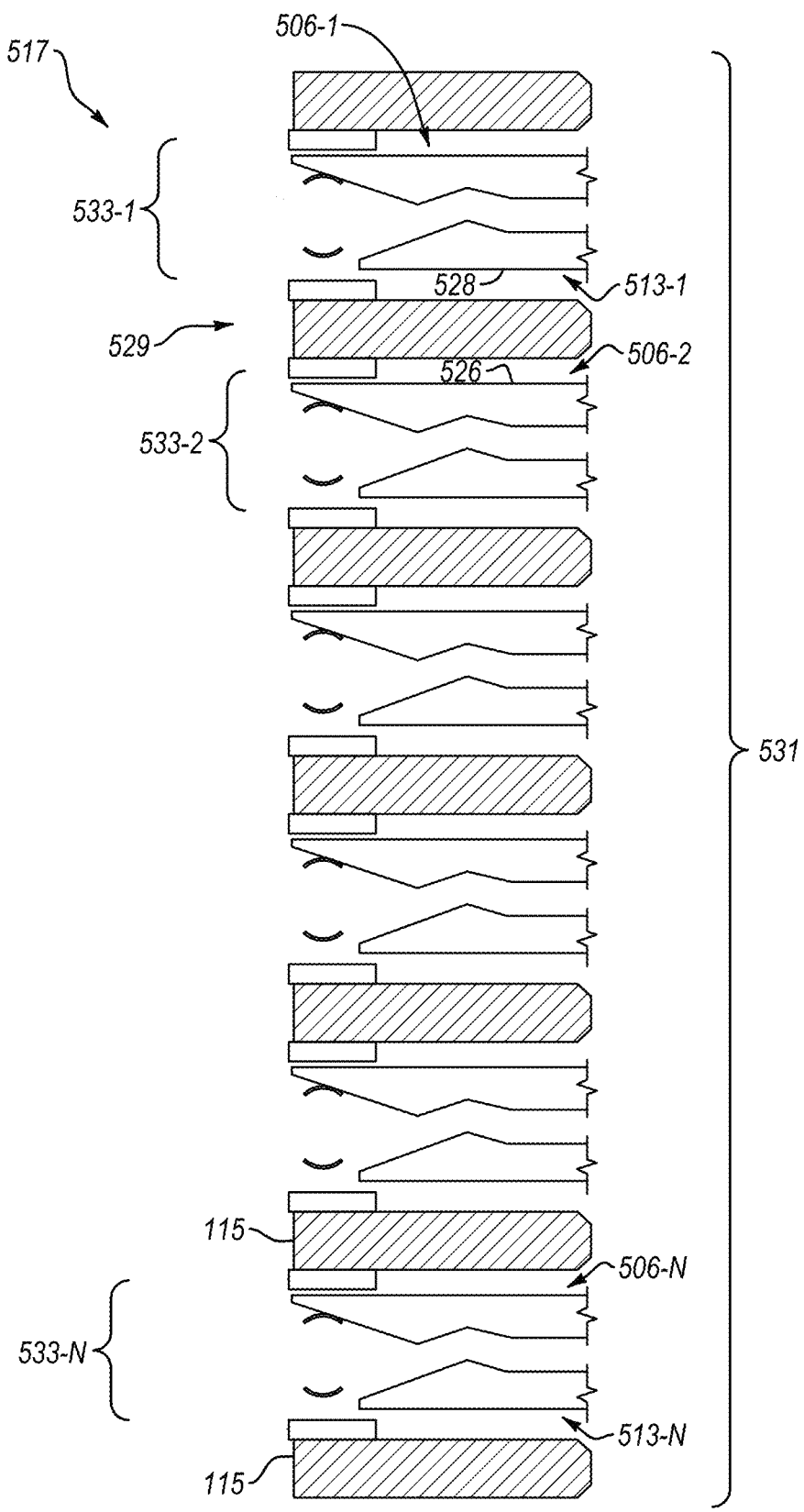
FIG. 5 is a cross-sectional view of another example of a ramp support having multiple ramps, according to one or more examples of the present disclosure.

FIG. 5 illustrates sets 533-1, . . . , 533-N of ramps 531 in a ramp support 517. The ramp support 517 is shaped similarly to the ramp supports 217 and 317. The sets 533-1, . . . , 533-N are pairs of ramps 531, each pair including a short ramp 513-1, . . . , 513-N that is shaped similarly to the second ramp 313 shown in FIGS. 3A-E and a long ramp 506-1, . . . , 506-N that is shaped similarly to the first ramp 306 shown in FIGS. 3A-E. Although not shown in FIG. 5, in some examples, the ramp support 517 includes twelve sets 533 of ramps. As such, the ramp support 517 includes twelve portions 529 configured to receive a portion of a disk 115, so that ramp support 517 receives up to twelve disks 115. As illustrated in FIG. 5, the portions 529 are between a straight edge 528 of a short ramp (e.g., 513-1) of one set (e.g., 533-1) and a straight edge 526 of a long ramp (e.g., 506-2) in a subsequent set (e.g., 533-2).

In some examples, the ramp support 517 includes thirteen sets 533 such that the ramp support 517 is configured to receive up to thirteen disks 115.

Figure 6:
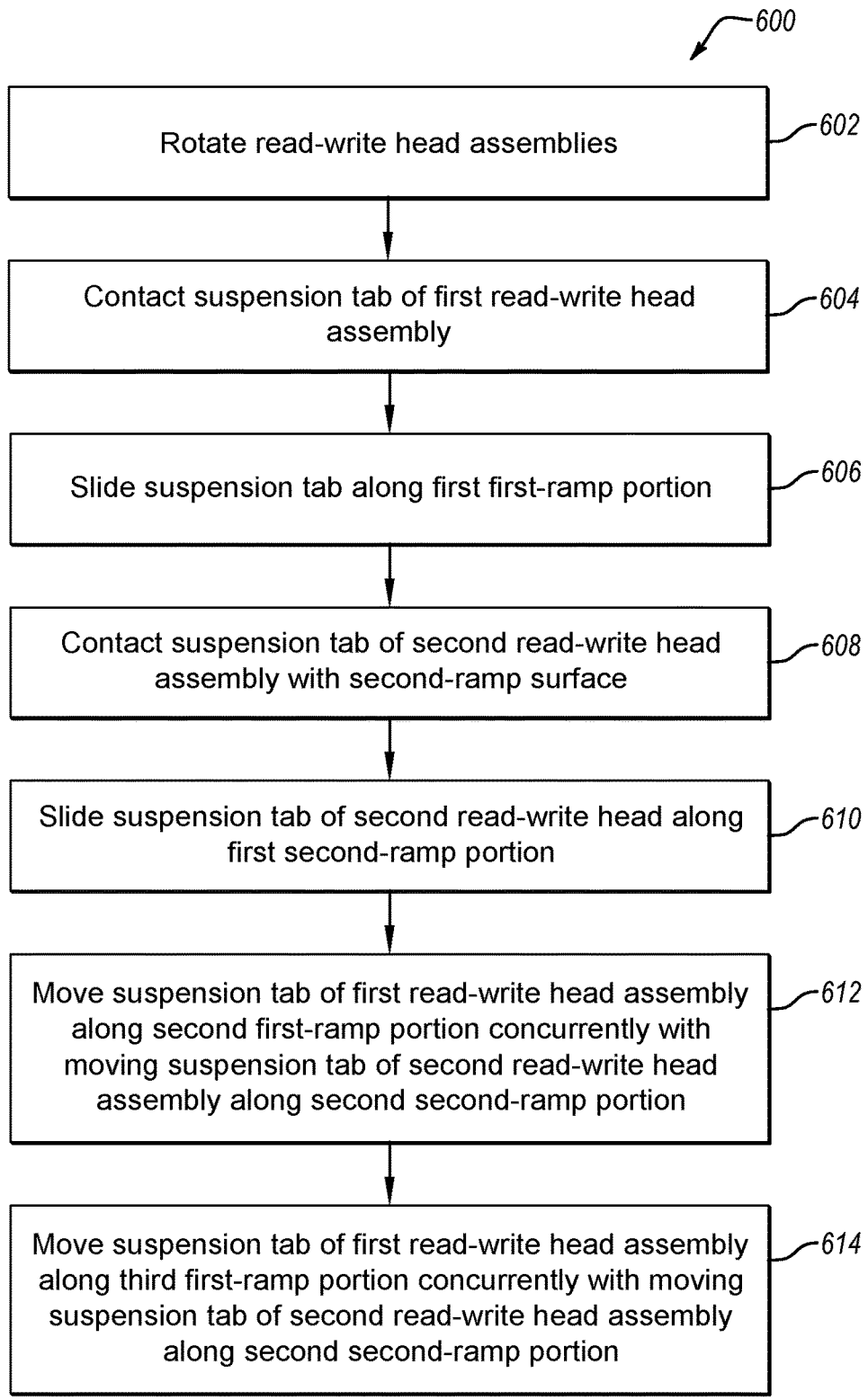
FIG. 6 is a schematic flow chart of a method of unloading read-write head assemblies from disks of a magnetic storage device, according to one or more examples of the present disclosure.

FIG. 6 is a schematic flow chart of a method 600 of unloading read-write head assemblies 110 from disks 115 of a magnetic storage device 100, according to one or more examples of the present disclosure. The method 600 begins and includes (block 602) rotating the read-write head assemblies 110 towards a ramp support 117. In some examples, rotating the read-write head assemblies 110 includes rotating the read-write head assemblies 110 at a substantially uniform speed.

As the read-write head assemblies 110 are rotated, the method 600 includes (block 604) contacting a suspension tab 349 of a first read-write head assembly of the read-write head assemblies 110 with a first-ramp surface 308. The method 600 includes (block 606) sliding the suspension tab 349 of the first read-write head assembly along a first first-ramp portion 309 to move the read-write head 148 of the first read-write head assembly away from a first disk 315.

The method 600 also includes (block 608) contacting a suspension tab 350 of a second read-write head assembly with a second-ramp surface 319. The method 600 further includes (block 610) sliding the suspension tab 350 of the second read-write head assembly along the second-ramp surface 319 to move the first read-write head 148 away from the first disk 315a. Contacting the suspension tab 350 of the second read-write head assembly with the second-ramp surface 319 is subsequent to contacting the suspension tab 349 of the first read-write head assembly with the first-ramp surface 308.

The method 600 additionally includes (block 612) moving the suspension tab 349 of the first read-write head assembly along a second first-ramp portion 311 concurrently with moving the suspension tab 350 of the second read-write head assembly along the first second-ramp portion 320 to move the read-write head toward the first disk 315a. The method 600 includes (block 614) moving the suspension tab 349 of the first read-write head assembly 110 along a third first-ramp portion 312 concurrently with moving the suspension tab 350 of the second read-write head assembly along a second second-ramp portion 323 to move the read-write head away from the first disk 315a.

In some examples, the method 600 includes moving the suspension tab 349 of the first read-write head assembly along a fourth first-ramp portion 356 that is substantially parallel to the first disk 115 and concurrently moving the suspension tab 350 of the second read-write head assembly along a third second-ramp portion 354 that is substantially parallel to the first disk 315. In some examples, a ramp portion substantially parallel to the first disk 315 is a ramp portion substantially parallel to a virtual plane 352 disposed between the first ramp 306 and the second ramp 313, as shown in FIG. 3E. In some examples, a ramp portion substantially parallel to the first disk 315 is a ramp portion substantially perpendicular to the rotational axis 124 of the disks 115.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

What is claimed is:

1. A magnetic storage device, comprising:
a number of disks rotatable about a first axis; and
a ramp support configured to receive a number of read-write head assemblies that are rotated radially outward from the number of disks, the ramp support comprising:
 a first ramp comprising:
  a first-ramp receiving end; and
  a first-ramp surface, comprising:
   a first first-ramp portion; and
   a second first-ramp portion; and
 a second ramp comprising an end, offset laterally from the first-ramp receiving end in a direction along a virtual plane that is interposed between the first ramp and the second ramp and extends radially outward from the first axis,
wherein in the direction along the virtual plane, the first first-ramp portion faces and is angled toward the virtual plane, and the second first-ramp portion faces and is angled away from the virtual plane.

2. The magnetic storage device of claim 1, wherein:
each read-write head assembly of the number of read-write head assemblies comprises a read-write head assembly of a carriage arm of a number of carriage arms;
each carriage arm of the number of carriage arms comprises:
 a first read-write head assembly, comprising:
  a suspension tab of the first read-write head assembly; and
  a first slider; and
 a second read-write head assembly, comprising:
  a suspension tab of the second read-write head assembly; and
  a second slider;
the magnetic storage device is configured to move each slider and suspension tab in a direction parallel to the virtual plane; and
the first ramp and the second ramp are positioned such that the suspension tab of the first read-write head assembly contacts the first first-ramp portion at a first time and the suspension tab of the second read-write head assembly contacts the second ramp at a second time that is different than the first time.

3. The magnetic storage device of claim 1, wherein the end of the second ramp is offset from the first-ramp receiving end by a distance of no less than 0.1 millimeters ("mm") and no greater than 0.3 mm.

4. The magnetic storage device of claim 1, wherein the second ramp further comprises:
a first second-ramp surface; and
a second second-ramp surface opposite the first second-ramp surface, wherein the second second-ramp surface faces a disk of the number of disks, the disk received by a portion of the ramp support.

5. The magnetic storage device of claim 1, wherein:
the first-ramp surface comprises a first first-ramp surface;
the first ramp further comprises a second first-ramp surface opposite the first first-ramp surface;
the second first-ramp surface faces a disk of the number of disks; and
the disk of the number of disks is received by a portion of the ramp support.

6. The magnetic storage device of claim 1, wherein:
the ramp support further comprises a plurality of first ramps and a plurality of second ramps separated into a plurality of sets each comprising a corresponding one of the plurality of first ramps and a corresponding one of the plurality of second ramps; and
at least one set of the plurality of sets comprises a first second ramp and a first first ramp positioned above the first second ramp in a direction that is substantially parallel to the first axis and at least one other set of the plurality of sets comprising a second second ramp and a second first ramp positioned below the second second ramp in a direction that is substantially parallel to the first axis.

7. The magnetic storage device of claim 1, wherein the first-ramp surface receives a convex portion of a first suspension tab of a first read-write head assembly of the number of read-write head assemblies, and the second ramp receives a convex portion of a second suspension tab of a second read-write head assembly of the number of read- write head assemblies.

8. The magnetic storage device of claim 1, wherein the first first-ramp portion and the second first-ramp portion are contiguous.

9. The magnetic storage device of claim 1, wherein the first first-ramp portion has a length greater than a length of the second first-ramp portion.

10. The magnetic storage device of claim 1, wherein the second ramp further comprises:
a first second-ramp portion; and
a second second-ramp portion having a length less than a length of the first second-ramp portion.

11. The magnetic storage device of claim 10, wherein the first first-ramp portion has a length greater than the length of the first second-ramp portion.

12. The magnetic storage device of claim 1, wherein:
the first first-ramp portion initiates at the first-ramp receiving end of the first ramp and extends away from the first-ramp receiving end;

the second ramp comprises a first second-ramp portion that initiates at the end of the second ramp and extends away from the end of the second ramp; and the second ramp further comprises a second second-ramp portion.

13. The magnetic storage device of claim 12, wherein:

the second first-ramp portion is substantially parallel to the first second-ramp portion;

the first ramp further comprises a third first-ramp portion; and the second second-ramp portion is substantially parallel to the third first-ramp portion.

14. The magnetic storage device of claim 13, further comprising:

a third second-ramp portion;

a fourth first-ramp portion;

a first gap between the second first-ramp portion and the first second-ramp portion;

a second gap between the third first-ramp portion and the second second-ramp portion;

and a third gap between the third second-ramp portion and the fourth first-ramp portion, wherein each of the first gap, the second gap, and the third gap is substantially constant in a direction along the virtual plane.

15. The magnetic storage device of claim 13, wherein:

an angle of the first first-ramp portion relative to the virtual plane is substantially equivalent to an angle of the first second-ramp portion relative to the virtual plane;

an angle of the second first-ramp portion relative to the virtual plane is substantially equivalent to an angle of the first second-ramp portion relative to the virtual plane; and an angle of the third first-ramp portion relative to the virtual plane is substantially equivalent to an angle of the second second-ramp portion relative to the virtual plane.

16. The magnetic storage device of claim 1, wherein the second first-ramp portion is offset laterally from the first first-ramp portion in a direction along the virtual plane.

17. The magnetic storage device of claim 1, wherein the first- ramp surface is configured to receive a convex portion of a suspension tab of a read-write head assembly of the number of read-write head assemblies, and the second ramp further comprises a second-ramp surface configured to receive a convex portion of a second suspension tab of a second read-write head assembly of the number of read-write head assemblies.

18. A magnetic storage device, comprising:

a means for magnetically storing data that is rotatable about a first axis; and a ramp support configured to receive a number of read-write head assemblies that are rotated radially outward from the means for magnetically storing data, the ramp support comprising:

a first ramp comprising:

a first-ramp receiving end; and a first-ramp surface, comprising:

a first first-ramp portion; and a second first-ramp portion; and a second ramp comprising an end, offset laterally from the first-ramp receiving end in a direction along a virtual plane that is interposed between the first ramp and the second ramp and extends radially outward from the first axis, wherein in the direction along the virtual plane, the first first-ramp portion faces and is angled toward the virtual plane, and the second first-ramp portion faces and is angled away from the virtual plane.

19. A method for assembling a magnetic storage device, the method comprising:

affixing a ramp support to a base plate of the magnetic storage device, the ramp support comprising:

a first ramp comprising:

a first-ramp receiving end; and a first-ramp surface, comprising:

a first first-ramp portion; and a second first-ramp portion; and a second ramp comprising an end, offset laterally from the first-ramp receiving end in a direction along a virtual plane that is interposed between the first ramp and the second ramp, wherein in the direction along the virtual plane, the first first-ramp portion faces and is angled toward the virtual plane, and the second first-ramp portion faces and is angled away from the virtual plane.

* * * * *